United States Patent Office 3,551,272
Patented Dec. 29, 1970

3,551,272
PAPER OVERLAYS AND LAMINATED MATERIALS
Jacob R. Ash, Seattle, Wash., assignor to Monsanto Company, St. Louis, Mo., a corporation of Delaware
No Drawing. Filed May 9, 1967, Ser. No. 637,087
Int. Cl. B32b 27/20, 27/42; D06b 7/04
U.S. Cl. 161—164      6 Claims

ABSTRACT OF THE DISCLOSURE

This application describes resin impregnated sheet material capable of being bonded directly to wood substrates at compressive pressures in the range of 150 to 350 p.s.i. and a temperature in the range of 250 to 400° F. while attaining superior surface properties such as abrasion resistance, appearance and the like. The sheet materials can be satisfactorily prepared by a single-pass impregnation method and are characterized by having the resin concentrated in the surface portions of the sheet material.

BACKGROUND OF THE INVENTION

This invention relates to improved resin impregnated sheet materials which are particularly useful as functional and/or decorative overlays for forest products and to the several aspects thereof including the method of treating the sheet material and the improved forest products overlayed with the improved resin impregnated sheet material.

Forest products, such as plywood, particle board, hardboard and the like are widely used in paneling, cabinetwork and applications where the surface is exposed. However, the surfaces of such products are generally unsatisfactory because of surface blemishes, chips, knot holes, irregular grains, checking, scuffing, marring, denting, etc. It is generally known that such surfaces can be improved through the lamination thereto of resin-containing papers, termed "overlay" or "prepreg." The prior art teachings in regard to overlay lamination, as exemplified in U.S. Pat. 2,964,426, indicate that high resin content containing papers and laminating pressures in the order of 1,000 p.s.i. are necessary to achieve satisfactory lamination or that a double impregnation of the paper with resins of different flow is required. Although the prior art teachings have achieved improved laminations of overlays and wood, the overlays themselves are generally rigid and break and tear easily during handling and impart only very limited wear and abrasion resistance when laminated onto a wood substrate.

SUMMARY

This invention is directed to overlays or prepregs having the impregnating resin concentrated in the surface portions of the base sheet material which are preparable by a one-pass impregnation method and to superior forest products surfaced with such overlays.

Accordingly, typical objects of this invention are to provide (1) an improved overlay or prepreg; (2) an improved method for resin impregnating sheet materials; (3) improved forest products; and (4) an improved sheet material impregnating resin composition.

Other objects, aspects and advantages of this invention will become apparent to those skilled in the art upon further study of this disclosure and the appended claims.

In accordance with this invention, an improved overlay is provided which comprises a sheet material, such as paper, natural or synthetic textile or other fabric and the like impregnated with a hardenable aminoplast resin system wherein the resin is distributed through the sheet material but is more concentrated in the surface portions thereof than in the interior portion thereof. Thus, the concentration of resin contained in the sheet material varies from a minimum, less than the average of the total resin content, in the innermost portion of the sheet to a maximum, greater than the average of the total resin content, in the surface portions of the sheet. The overlays of this invention exhibit a marked increase in abrasion resistance and a marked decrease in weight loss during abrading when laminated to a suitable substrate. The novel overlays of this invention, as measured from a decorative overlay, exhibit a Taber abrasion resistance (hereinafter fully defined) of at least 175 revolutions to first pattern rupture, at least 350 revolutions to 50% pattern removal, and less than 0.035 gram loss after first 1,000 revolutions.

The aminoplast resin employed in the impregnating resin system can be formed from any resin-forming amino compound. The aminotriazine compounds, such as melamine, substituted melamines, cycloaliphatic guanamines, and mixtures thereof are preferred for this invention. Suitable substituents for the melamine are 1–6 carbon atoms, preferably 1–4 carbon atom alkyl groups and 1–2 phenyl groups. Examples of such substituted melamines are monomethyl melamine, dimethyl melamine, trimethyl melamine, tetramethyl melamine, monoethyl melamine, monophenyl melamine, diphenyl melamine, and the like. Aliphatic guanamines, in general, can be used. Examples of suitable aliphatic guanamines are tetrahydrobenzoguanamine, benzoguanamine, acetoguanamines, hexahydrobenzoguanamine, 3 - methyl - tetrahydrobenzoguanamine, 3-methyl-hexahydrobenzoguanamine, 3,4-dimethyl-1,2,5,6-tetrahydrobenzoguanamine, 3,4-dimethyl-hexahydrobenzoguanamine, and the like. Preferred aliphatic guanamines are tetrahydrobenzoguanamine, benzoguanamine and acetoguanamine. Desirable mixtures of aminotriazine compounds are melamine and dimethyl melamine, melamine and tetrahydrobenzoguanamine, and the like. When employing a mixture of aminotriazine compounds as for example, melamine and tetrahydrobenzoguanamine, the mixture should consist of 95–5 weight percent of melamine and, correspondingly, 5–95 weight percent of tetrahydrobenzoguanamine. The same limits of the mixture would apply when using any mixture of the aminotriazine compounds. A preferred mixture is 75–95 weight percent of melamine and, correspondingly, 25–5 weight percent of tetrahydrobenzoguanamine.

Any aliphatic aldehyde which will condense with the resin forming amino compounds can be employed as the aldehyde component. Particularly useful are acetaldehyde, butyraldehyde, formaldehyde, crotonic aldehyde, acrolein, heterocyclic aldehydes such as furfuraldehyde and the like. The preferred aldehyde is formaldehyde.

If desired, thiourea may be included in the resins in amounts of up to about 2.5 parts per 97.5 parts of an aminotriazine compound. The presence of this quantity of thiourea accelerates the cure rate of the resin and also increases the gloss of laminates prepared therefrom. In addition, the presence of thiourea, in the resin permits decorative laminates having overlay sheet impregnated therewith to be removed from the press hot with little or no loss of gloss. In another embodiment of the invention, comparable results are obtained by admixing thiourea with a solution of a resin of this invention in amounts of up to about 2.5 parts per 97.5 parts of melamine contained in the resin.

The aminoplast resin may contain polyhydroxyl-containing compounds such as sucrose, ethylene glycol, disaccharides, dextrin, corn syrup, starch hydrolysates, glycerin, sorbitol, diethylene glycol, and the like. The preferred polyhydroxyl containing compound is sucrose. The polyhydroxyl containing compound may be added either at the start of the acidic reaction or at the beginning of the reaction and thus present during the initial alkaline reaction. The polyhydroxyl containing compound is employed in an amount of between about 5–65 parts per 100 parts of the amino compound. Optimum solution stability is attained when the resins contain about 15–50 weight percent of the polyhydroxyl-containing compound and optimum postformability is attained when the resins contain 20 or more weight percent thereof. An optimum balance of properties of transparency, solution stability and postformability is attained when the resins contain about 15–25 weight percent of the polyhydroxyl-containing compound. The preferred animoplast resins for use in this invention are those described and prepared by the process disclosed and claimed in copending application, Ser. No. 531,051, filed Mar. 2, 1966, which disclosure is hereby incorporated herein.

Latent curable catalysts can be used in the impregnating resin system employed in this invention. Such catalysts are those which liberate acid when subjected to heat and are employed in amounts varying from 0.01–10.0 weight percent based on the weight of the resin solids and, preferably, will vary from 0.01 to 4.0 weight percent. Such catalysts include the organic and inorganic acid salts of primary, secondary, and tertiary amines such as the hydrochloric acid salt of 2-amino-2-methyl-propanol-1, the hydrochloric acid salts of mono-, di-, and tri-ethanol-amine, the hydrochloric acid salts of 2-demethylamino-2-methyl propanol, the para-toluene sulfonic acid salt of 2-amino-2-methyl propanol-1 the chloroacetic acid salt of pyridine, the triammonium acid pyrophosphate salt of 2-amino-2-methyl propanol-1, the phosphoric acid salt of 2-amino-2-methyl propanol-1, the phosphoric acid salt of mono-, di-, and tri-ethanolamines, the phosphoric acid salt of 2-dimethylamino-2-methyl propanol, etc. Other catalysts include the inorganic salts of inorganic acids such as ammonium chloride, magnesium chloride, inc chloride, and the like. In fact, the catalyst system may include mixtures of the above different types of catalysts such as a mixture of magnesium chloride and the hydrochloric acid salt of 2-amino-2-methyl propanol-1, a mixture of the hydrochloric acid salt of monoethanolamine and diethanol-amine, and the like.

Various additives, fillers and pigments can be used in the resin system of this invention. A particular suitable additive is silica aerogel which is a lower density, finely-divided, porous, white powder. It is prepared from silica aquagels by a unique process which permits drying of the gel without shrinkage of the solid structure. This unique method comprises drying a silica gel at a pressure above the critical pressure of the solvent in the gel. Under these conditions, no shrinkage of the gel occurs and the final product consists essentially of the skeleton of the colloid as it existed in the original undried gel. The method for drying the silica gels may also be said to be a method for replacing the liquid in the gel with air without altering the physical shape of the silica. The aerogels and methods for making them are more fully described in U.S. Pat. 2,093,454 to Samuel S. Kistler. The additives, etc., if added to the resin system are employed in an amount of about 0.1–10 parts, and preferably about 1–7 parts per 100 parts of resin solids in the system.

The process for depositing the resin system can be achieved by any of several known means such as immersion, spraying, doctoring, rolling, brushing, and the like. However, a particular advantages of this invention is the fact that superior overlays or prepregs are attained by using a one-pass immersion technique. In such a technique, the sheet material is passed once through a solution of the resin system, the surplus solution of resin is removed with scrapers, squeeze rolls or other metering devices. A typical technique comprises passing the treated sheet through the nip of matching roll bars set at a desired opening to remove excess resin. The resin treated sheet is the partially dried without completely curing the resin at a suitable temperature and time. Preferably, the drying adjusts the flowability of the resin to below 40%.

The overlays or prepregs produced in accordance with this invention can be laminated directly to the surface of a substrate under a compressive pressure below 350 p.s.i. and at a temperature below 400° F. The superior overlay-substrate laminated product obtained is characterized by exceptional surface appearance and low abrasion weight loss, i.e. less than 0.035 gram per first 1,000 revolutions applied by a Taber Abraser.

The sheet materials applicable to this invention may be of any natural or synthetic material useful in the prepartion of overlays or prepregs. The sheet material may be in the form of films, textile or other fabric and the like. A most common suitable sheet material is paper and for use in this invention it may vary according to the pulp used in the furnish and the method of manufacturing. Kraft or sulfite pulp sheets or mixtures thereof are commonly used. Groundwood pulp, semi-chemical pulp, or cold caustic pulp may be incorporated with the chemical pulp or pulps in order to improve the formation of the sheets. Generally speaking, the base sheet which is to be impregnated should be a fairly heavy, moderately dense and moderately absorbent sheet. Base sheets having a basis weight of from about 15 to 100 pounds per 3,000 square feet and containing a substantial percentage of chemical pulp will be found most satisfactory. Such sheets having a caliper from about 3 to 10 mils, and preferably 4 to 6 mils, and a density in the range of from about 0.5 to about 0.8 gram per cubic centimeter can be readily impregnated by passage through a bath containing the impregnating resin to provide the desired resin content. Base sheets having a basis weight of from about 35 to 60 pounds per 3,000 square feet is preferred for most applications. The base sheet preferably contains a printed pattern and is thus used as decorative overlay or prepreg to attain decorative panels and products.

The substrate contemplated as useful materials to be treated in accordance with the invention are those relatively inflexible, non-metallic, non-thermoplastic sheets having surfaces which are substantially smooth and free of gouges and other surface defects. Typical of such preferred species are plywood, composition boards, such as particle board, chipboard, and the like. All of the boards of the indicated varieties are characterized in being relatively inflexible in the sense that they cannot be bent about a small radius of curvature without splitting, fracturing, or being damaged in other manner. The preferred species likewise are the common materials employed in interior partitioning or paneling. Certain of them are also commonly used in cabinetwork.

For best results, the surface of the substratum should be relatively smooth prior to lamination of the overlay. Thus, any concavities such as knotholes, gouges, splits, and the like should be repaired or filled prior to lamination. In similar manner, the surface should be freed of any protruding roughness in the form of grits, slivers, bumps or other protuberance, since these will frequently be transmitted through the overlay as surface roughness. These defects may be removed by sanding, planing, or similar conventional operation.

DESCRIPTION OF PREFERRED EMBODIMENTS

The following examples are set forth to more fully describe this invention and such are not intended to impose limitations upon the invention. Where parts are mentioned, they are parts by weight unless otherwise stated.

Example I

Part A.—Mix together 372 parts of formalin (50% formaldehyde), 0.22 part of 50% NaOH, 165.6 parts of sucrose, and 78 parts of melamine. Adjust the pH of the mixture to 8.5–8.7 with 50% NaOH or 85% formic acid and then heat the mixture to initiate the reaction. The heat of reaction causes the temperature to rise. Hold the mixture at 70–75° C. with cooling, if necessary, for 10 minutes and then cool the mixture to 65° C. Add 0.34 part of 96%

$H_2SO_4$, adjust the pH of the mixture of 4.0–5.0 and continue the reaction at 65±2° C. for 15 minutes. Then add 1.09 parts of 50% NaOH, 234 parts of melamine and adjust the pH of the mixture to 9.0–9.5. Heat the mixture and continue the reaction at 93–97° C. until the resin has a water dilutability of 37–39%.

Part B.——To 100 parts of the liquid resin, adjusted to 60% solids, of Part A is added 17.5 parts of water and 2.0 parts of the hydrochloric acid salt of 2-amino-2-methyl propanol-1. This admixture is identified as system B–1.

To 100 parts of the liquid resin, adjusted to 60% solids, of Part A is added 17.5 parts of water, 2.0 parts of the hydrochloric acid salt of 2-amino-2-methyl propanol-1 and 3.2 parts of a silica aerogel. This admixture is identified as system B–2.

Example II

Part A.—A sheet of 65 pounds basis weight printed light Indian teak paper is dipped in a bath of system B–1 of Example I and passed through a roll bar system having an opening gap of 14.5 mils. The thus treated paper is dried for 6 minutes at 180° F. in a circulating oven. The treated paper has a resin content of 51.7% based on the weight of the paper plus resin, a volatile content of 7.5% and a flow of 1.8% and is designated Sample A.

Part B.—Another sheet of the same paper as used in Part A is passed through a bath of system B–2 of Example I and then through nip rolls and into and through a circulating oven maintained at 180° F. at a rate of 170 yards per hour. The treated paper has a resin content of 51.0% based on the weight of the paper plus resin, a volatile content of 6.6% and a flow of 4.7% and is designated Sample B.

Samples of the above impregnated papers having a thickness of about 9 mils, one square foot in size, are surface scraped to obtain several 0.1 gram samples from each paper. Each 0.1 gram sample represents a particular depth level of each sample. The samples (scrapings) are micro nitrogen analyzed to determine the quantity of impregnating resin therein. The results are given in the following table.

TABLE I

| Sample No.: | Impregnated paper | Sample depth from surface, mils | Percent nitrogen | % resin content [1] |
|---|---|---|---|---|
| 1 | A | 0–0.25 | 24.72 | 79.74 |
| 2 | A | 0.25–0.40 | 22.76 | 73.42 |
| 3 | A | 0.40–0.55 | 21.24 | 68.52 |
| 4 | A | 0.55–0.70 | 19.03 | 61.39 |
| 5 | A | 0.70–0.85 | 18.53 | 59.77 |
| 6 | B | 0–0.40 | 28.06 | 90.52 |
| 7 | B | 0.40–0.60 | 27.58 | 88.97 |
| 8 | B | 0.60–0.80 | 27.52 | 88.77 |
| 9 | B | 0.80–0.95 | 24.71 | 79.71 |
| 10 | B | 0.95–1.10 | 23.03 | 74.23 |
| 11 | Resin | | 31.51 | 100.00 |
| 12 | Paper | | 0.15 | |

[1] Percent RC=percent N/0.31.

The above data clearly shows that the resin impregnated paper of this invention has the impregnating resin concentrated in the surface portions thereof.

Example III

Part A.—To 930 parts of the liquid resin containing 60% solids of Example I, Part A is added 162 parts of water and 18 parts of the hydrochloric acid salt of 2-amino-2-methyl propanol-1. This admixture is identified as system A–III.

To 930 parts of the liquid resin containing 60% solids of Example I, Part A is added 162 parts of water, 18 parts of the hydrochloric acid salt of 2-amino-2-methyl propanol-1, and 29 parts of a silica aerogel. This admixture is identified as system B–III.

Part B.—A sheet of 65 pounds basis weight printed light Indian teak paper is dipped in a bath of system A–III of Part A and passed through a roll bar system having an opening gap of 15 mils. The thus treated paper is dried for 6 minutes at 180° F. in a circulating oven. The treated paper has a resin content of 52% based on the weight of the paper plus resin, a volatile content of 8.0% and a flow of 2.2% and is designated Sample A.

Another sheet of 65 pounds basis weight printed light Indian teak paper is dipped in a bath of system B–III of Part A and passed through a roll bar system having an opening gap of 14 mils. The thus treated paper is dried for 6 minutes at 180° F. in a circulating oven. The treated paper has a resin content of 51.6% based on the weight of the paper plus resin, a volatile content of 8.1% and a flow of about 2.0% and is designated Sample B.

Part C.—A sheet of Sample A of Part B and a sheet of Sample B of Part B are laminated separately onto 5 inch by 10 inch panels having 0.086 inch hardboard facings and a 0.1 inch fir core by pressing each sheet onto a panel for 10 minutes at 300° F. and under a pressure of 175 p.s.i. These overlayed panels and a 0.1 inch hardboard sheet having laminated thereto a sheet of 92 pounds basis weight printed paper containing a resin content of 56% based on the weight of the paper plus resin obtained from the patentee of United States Pat. No. 2,964,426 and identified as Tegotex D II are tested on a Taber Abraser and exhibit abrasion resistance as shown in Table II.

TABLE II.—PANEL

| Taber Abrasion | Sample A | Sample B | Tegotex D II [1] |
|---|---|---|---|
| Revolutions to 1st pattern rupture | 1,100 | 200 | 27 |
| Revolutions to 50% pattern removal | 2,000 | 400 | 126 |
| Grams loss at 1st 1,000 revolutions | 0.0136 | 0.0302 | 0.0495 |
| Grams loss at 1st 2,000 revolutions | 0.0242 | 0.0518 | 0.0802 |

[1] U.S. Patent 2,964,426.

This example shows the improvement in abrasion resistance of overlaid panels prepared in accordance with this invention over those prepared in accordance with the prior art teachings.

The Taber abrasion values reported in this disclosure are measured on a Taber Abraser manufactured by the Taber Instrument Company, North Tanawanda, N.Y. using Calibrase CS–17 wheels. A 4" x 4" x ¼" specimen having a ¼" hole in the center is secured on the turntable of the abraser. A pressure of 1,000 grams is applied to each CS–17 Calibrase wheel. As the turntable revolves, it is closely examined to observe any breaks occurring in the pattern. The values for abrasion resistance are reported as revolutions to first pattern rupture and revolutions to removal of 50% of the pattern. The grams loss of the specimen is determined by difference between the weight of the unabraded specimen and the weight of the abraded specimen at any number of revolutions.

The percent cured resin solids is determined as the weight of the cured resin treated paper minus the dry weight of the untreated paper divided by the weight of the cured resin treated paper.

The percent volatile content is determined as the weight of a 4" diameter disc of the resin treated paper minus the weight of the cured resin treated paper disc after drying for 10 minutes at 160° C. in a circulating oven times 100 divided by the weight of the resin treated paper disc. The percent flow is determined as the weight of six 1⅝" diameter discs of unpressed resin treated paper minus the weight of the six resin treated paper discs after pressing for 7 minutes at 141° C. and 200 p.s.i. and having the exuded resin scraped from the edges thereof times 100 divided by the weight of the six unpressed resin treated paper discs.

The treated papers of this invention have exceptional appearance, abrasion resistance, scratch resistance, light stability, and flexibility compared with similar commercial products. These papers fully bond and cure within a press time of about 6 minutes at temperatures as low as 275° F. and press pressures as low as about 150 p.s.i. which is about 25 to 50% shorter than required by commercial prepregs.

The treated sheet materials of this invention are characterized by having a predominant portion of the resin solids content concentrated in the surface portions thereof and having a total resin content of from about 35–75, preferably 45–55, weight percent based on the treated weight of the paper.

In a further embodiment of this invention, a clear overlay sheet can be advantageously employed over the clear or decorative paper overlays or prepregs of this invention.

It is obvious that many variations may be made in the products and processes of this invention without departing from the spirit and scope thereof.

What is claimed is:

1. An overlay bondable directly to a substrate at a pressure below 350 p.s.i. and at a temperature between 250 to 400° F. consisting of a sheet material having been impregnated only once with an aminoplast resin system wherein the aminoplast resin is distributed through said sheet material and the concentration of said distributed aminoplast resin varies from a maximum at the surface portions of said sheet material to a minimum at the intermost portion of said sheet material; said aminoplast resin, calculated as resin solids, being 35 to 75 weight percent of said overlay.

2. The overlay of claim 1 wherein said aminoplast resin system contains 0.01 to 10 parts, based on the weight of the aminoplast resin, of at latent curing catalyst for the resin and 0.1 to 10 parts, based on the weight of the aminoplast resin, of silica aerogel.

3. The overlay of claim 1 wherein said sheet material is printed paper having a basis weight of 15–100 lbs./3,000 sq. ft., a thickness of 3–10 mils and a density of 0.5–0.8 gm./cc. and said aminoplast resin, calculated as resin solids, being 45 to 55 weight percent of said overlay.

4. A forest product having an overlay as defined in claim 1 integrally bonded to at least one surface thereof.

5. A forest product having an overlay as defined in claim 4 integrally bonded to at least one surface thereof and having a minimum Taber abrasion resistance of 175 revolutions to first pattern rupture and 350 revolutions to 50% pattern removal and a maximum abrasion weight loss of 0.035 gram per 1000 Taber Abraser revolutions.

6. The process of preparing an overlay, bondable directly to a substrate at a pressure below 350 p.s.i. and at a temperature between 250 to 400° F., consisting of a sheet material and an aminoplast resin whereby the concentrations of said aminoplast resin at the surface portions of said sheet material is greater than the average aminoplast resin content of said overlay comprising treating said sheet material with an aqueous aminoplast resin system only once removing excess aminoplast resin, and then partially drying the treated sheet material until the aminoplast resin flow is less than 40%.

References Cited

UNITED STATES PATENTS

| | | | |
|---|---|---|---|
| 2,093,454 | 9/1937 | Kistler | 252—62X |
| 2,964,426 | 12/1960 | Holtschmidt | 161—263X |
| 3,117,053 | 1/1964 | Lawrence et al. | 161—263X |
| 3,165,379 | 1/1965 | Schwartz | 252—317X |
| 3,194,720 | 7/1965 | Grudus et al. | 161—263X |
| 3,318,760 | 5/1967 | Boenig et al. | 161—263 |
| 3,369,962 | 2/1968 | Hochner et al. | 161—263X |

JOHN T. GOOLKASIAN, Primary Examiner

G. W. MOXON, II, Assistant Examiner

U.S. Cl. X.R.
117—155; 161—263